United States Patent
Accapadi et al.

(10) Patent No.: US 7,487,503 B2
(45) Date of Patent: Feb. 3, 2009

(54) SCHEDULING THREADS IN A MULTIPROCESSOR COMPUTER

(75) Inventors: Jos Manuel Accapadi, Austin, TX (US);
Mathew Accapadi, Austin, TX (US);
Andrew Dunshea, Austin, TX (US);
Mark Elliott Hack, Cedar Park, TX (US); Agustin Mena, III, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 10/916,976

(22) Filed: Aug. 12, 2004

(65) Prior Publication Data

US 2006/0037020 A1 Feb. 16, 2006

(51) Int. Cl.
*G06F 9/46* (2006.01)
*G06F 13/24* (2006.01)

(52) U.S. Cl. ........................ 718/103; 710/262
(58) Field of Classification Search ............... 718/102, 718/103, 105, 100, 104; 710/262, 264, 265, 710/267
See application file for complete search history.

(56) References Cited

U.S. PATENT DOCUMENTS

| 5,481,719 | A | 1/1996 | Ackerman et al. |
| 5,606,696 | A | 2/1997 | Ackerman et al. |
| 6,006,247 | A * | 12/1999 | Browning et al. ........... 718/102 |
| 6,061,710 | A | 5/2000 | Eickemeyer et al. |
| 6,735,769 | B1 | 5/2004 | Brenner et al. |
| 7,127,716 | B2 * | 10/2006 | Jin et al. ..................... 718/105 |
| 2003/0184290 | A1 | 10/2003 | Endo et al. |
| 2004/0064676 | A1 * | 4/2004 | Burugula et al. ............. 712/30 |

OTHER PUBLICATIONS

U.S. Appl. No. 10/671,057, filed Sep. 25, 2003, Accapadi et al.
U.S. Appl. No. 10/422,020, filed Apr. 23, 2003, Burky et al.
U.S. Appl. No. 10/834,498, filed Apr. 29, 2004, Accapadi et al.
Noto, et al.; Method for Achieving Hardware Interrupt Fairness; Feb. 1994; pp. 265-266; TDB vol. 37 n2B; US.

* cited by examiner

*Primary Examiner*—Meng-Ai An
*Assistant Examiner*—Caroline Arcos
(74) *Attorney, Agent, or Firm*—John Biggers; Justin Dillon; Biggers & Ohanian LLP.

(57) ABSTRACT

Methods, systems, and computer program products are provided for scheduling threads in a multiprocessor computer. Embodiments include selecting a thread in a ready queue to be dispatched to a processor and determining whether an interrupt mask flag is set in a thread control block associated with the thread. If the interrupt mask flag is set in the thread control block associated with the thread, embodiments typically include selecting a processor, setting a current processor priority register of the selected processor to least favored, and dispatching the thread from the ready queue to the selected processor. In some embodiments, setting the current processor priority register of the selected processor to least favored is carried out by storing a value associated with the highest interrupt priority in the current processor priority register.

1 Claim, 3 Drawing Sheets

SCHEDULING THREADS IN A MULTIPROCESSOR COMPUTER

BACKGROUND OF THE INVENTION

1. Field of the Invention

The field of the invention is data processing, or, more specifically, methods, systems, and products for scheduling threads in a multiprocessor computer.

2. Description of Related Art

A thread is a unit of software execution on a multiprocessing computer. On such a computer, software programs are executed in units of execution called 'processes' that include all the processor registers, code segment and offset registers, data segment and offset registers, stack segment and offset registers, flag registers, instruction pointer registers, program counters, and so on, needed for execution of software programs. For efficiency, 'processes' are often organized further as threads, where each thread of a process individually possesses all the attributes needed for execution except that a thread shares memory among all the other threads of a process, thereby reducing the overhead of operating system switches from thread to thread ('context switches').

A ready queue contains all the threads of the system that are in the 'ready' state, waiting in priority order for dispatching to a processor. Threads are placed in the ready queue when they are first created and from a wait queue upon returns from system calls. When dispatched to a processor, each thread is typically authorized to occupy the processor for no more than a maximum amount of time referred to as a 'time slice,' after which the thread is said to be 'preempted' for return to the ready queue until other threads have a chance to run on the processor. Threads also are also typically placed on the ready queue when they are preempted while running on a processor; that is, when a higher priority thread arrives in the ready queue or when a thread's time slice expires.

Threads that are in the 'wait' state are maintained a wait queue. Threads in the wait state are often waiting for input/output returns from peripheral devices such as user input devices, display devices, communications adapters, memory, and others as will occur to those of skill in the art. Threads running on a processor are moved to the wait queue and to the 'wait' state when they issue system calls. Such system calls are often requests for data input from or output to peripheral devices.

An interrupt is a mechanism by which a computer subsystem or module external to a processor may interrupt the otherwise normal flow of operations on the processor. In particular, in interrupt-drive input/output processing, interrupts are provided so that a thread sending or receiving data to or from a peripheral device need not block and wait. Instead, the thread issues a system call and suspends operation while waiting on the wait queue for its data. When the peripheral device has the data ready, the peripheral device triggers an interrupt by signaling the processor, usually by way of a system bus. The processor 'catches' the interrupt, saves the running thread's operating context, and then hands control over to an interrupt handler that 'clears' the interrupt by processing it. The interrupted thread's saved operating context is at least all information needed to resume thread processing at the point at which it was interrupted, that is, at least the processor status registers and the location of the next instruction to be executed in the interrupted thread, in addition to whatever other information is needed by the particular operating system.

Modern interrupt handlers are typically split into two parts, a first level interrupt handler ("FLIH") and a second level interrupt handler ("SLIH"). The first level interrupt handler discovers the cause of the interrupt. The first-level interrupt handler typically does not however process the interrupt. The first level interrupt handler instead typically calls a second level interrupt handler to process the interrupt. The second level interrupt handler is often associated with the particular device which generated the interrupt. After being called by the first level interrupt handler, the second level interrupt handler sits in the ready queue until processor time becomes available to process the interrupt.

Second level interrupt handlers may be assigned a lower priority than a thread currently running on the processor and therefore, may not have an opportunity to run for a relatively long period of time. In such situations, the second level interrupt handler often waits in the ready queue for some time before gaining access to the CPU to process the interrupt. When processing generates many interrupts, the delay in processing those interrupts caused by the second level interrupt handler waiting in the ready queue diminishes efficiency.

Prior art solutions included binding interrupt processing exclusively to a single processor or to a subset of the processors on a system and refraining from assigning threads to processors reserved for interrupt processing. Such an approach is relatively static, however, leaving interrupt processing on a subset of processors and thread processing on a subset of processors even when other processors would otherwise be available to spread occasional large loads of thread processing or interrupt processing. There is an ongoing need therefore for improvement in scheduling threads in a multiprocessor computer system.

SUMMARY OF THE INVENTION

Methods, systems, and computer program products are provided for scheduling threads in a multiprocessor computer. Embodiments include selecting a thread in a ready queue to be dispatched to a processor and determining whether an interrupt mask flag is set in a thread control block associated with the thread. If the interrupt mask flag is set in the thread control block associated with the thread, embodiments typically include selecting a processor, setting a current processor priority register of the selected processor to least favored, and dispatching the thread from the ready queue to the selected processor. In some embodiments, setting the current processor priority register of the selected processor to least favored is carried out by storing a value associated with the highest interrupt priority in the current processor priority register. Typical embodiments also include setting the current processor priority register of the selected processor to a value other than least favored when the thread leaves the selected processor.

Many embodiments of the present invention also include maintaining a count of the number of processors in the multiprocessor computer having a current processor priority register set to least favored. In typical embodiments, selecting a processor includes comparing the count of the number of processors having a current processor priority register set to least favored to a threshold value, and if the count of the number of processors having a current processor priority register set to least favored is less than a threshold value, selecting a processor having a current processor priority register not set to least favored. Many embodiments include dynamically updating the threshold value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for scheduling threads in a multiprocessor computer. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Scheduling Threads in a Multiprocessor Computer

Figure 1:
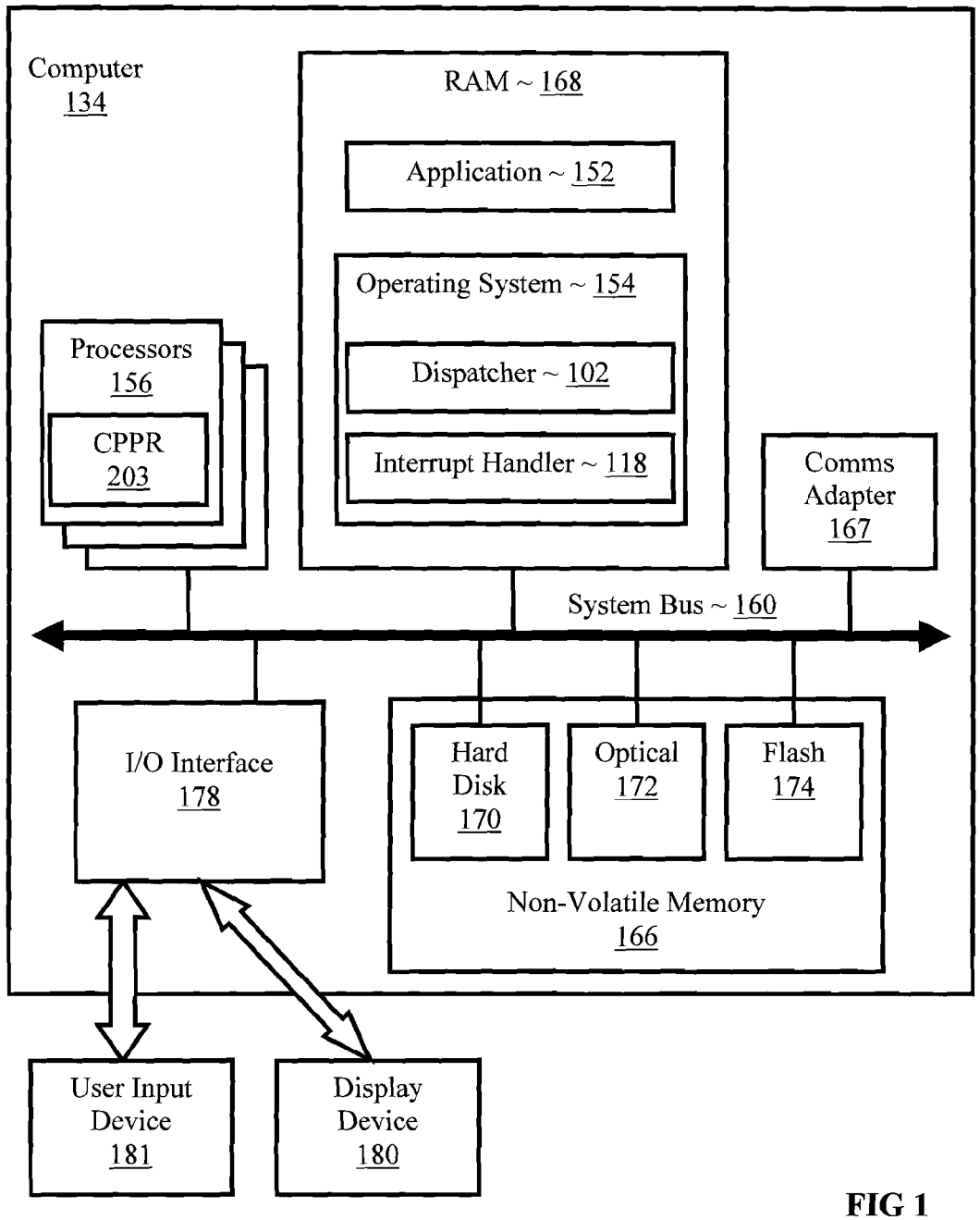
FIG. 1 sets forth a block diagram of an exemplary multiprocessor computer system capable of scheduling threads in accordance with the present invention.

Exemplary methods, systems, and computer program products for scheduling threads in a multiprocessor computer system according to embodiments of the present invention are described with reference to the accompanying drawings, beginning with FIG. 1. FIG. 1 sets forth a block diagram of an exemplary multiprocessor computer system (134) capable of scheduling threads in a multiprocessor computer system by selecting a thread in a ready queue to be dispatched to a processor, and determining whether an interrupt mask flag is set in a thread control block associated with the selected thread. If the interrupt mask flag is set in the thread control block associated with the thread, the system of FIG. 1 is capable of selecting a processor, setting a current processor priority register of the selected processor to least favored, and dispatching the thread from the ready queue to the selected processor. As discussed below, the phrase 'least favored' means least favored for interrupts. By setting the current processor priority register to least favored, the system of FIG. 1 advantageously provides a mechanism to dispatch a thread to a selected processor for uninterrupted processing.

The exemplary computer (134) of FIG. 1 shows three computer processors (156). The number three is not a limitation of the invention, however, as computer systems according to embodiments of the present invention may include any number of processors. Moreover, the type of processor also is not a limitation of the present invention. Some processors may support execution of only one thread at a time. Other processors may support hardware multi-threading or 'simultaneous multi-threading' ('SMT'), hardware support for multiple independent threads on a processor at the same time, multiple registers sets for threads instead of just one, allowing multiple threads to issue multiple instructions during each cycle of a processor's execution. Threads running on SMT processors experience interrupts just as do threads on single-threaded processors, and methods according to the present invention are equally useful on both.

The processors (156) of FIG. 1 also include a current processor priority register ("CCPR") (203). The current processor priority register (203) is a register used to store a value defining the current priority of the processor for servicing interrupts. The priority value stored in the current processor priority register is used to determine whether current processing on the processor is to be interrupted by a particular interrupt. Each interrupt has an associated priority value. If the priority value stored in the current processor priority register is lower than the priority value of an interrupt, current processing is interrupted. If the priority value stored in the current processor priority register is not lower than the priority value of an interrupt, current processing continues uninterrupted. In conventional systems, the current processor priority register is typically set to the priority value of an interrupt the processor is currently servicing, and therefore, interrupt processing is only interrupted by a higher priority interrupt. The system of FIG. 1 however is also capable of setting the current processor priority register to least favored for threads having an interrupt flag mask set in their associated thread control block, thereby allowing the thread to be processed as a highest priority interrupt resulting in uninterrupted processing of the thread.

The computer of FIG. 1 also includes random access memory (168) ("RAM"). Stored in RAM (168) is an application program (152). Application programs useful in systems according to the present invention include, word processors, spreadsheets, database management systems, email clients, web servers, and any other application as will occur to those of skill in the art.

Also stored in RAM (168) is an operating system (154), which in turn includes a dispatcher (102) and an interrupt handler (118). Operating systems useful in computers according to embodiments of the present invention include Unix™, Linux™, Microsoft NT™, and many others as will occur to those of skill in the art. Interrupt handler (118) is a software function in the operating system that processes interrupts. Although FIG. 1 shows only one interrupt handler (118), modern interrupt handlers are typically split into two parts, a first level interrupt handler ("FLIH") and a second level interrupt handler ("SLIH"). As discussed above, the first level interrupt handler discovers the cause of the interrupt and calls a second level interrupt handler to process the interrupt. The second level interrupt handler is often associated with the particular device which generated the interrupt.

The exemplary dispatcher (102) of FIG. 1 is a software function in the operating system programmed according to embodiments of the present invention, in addition to its usual duties of administering the status of threads in the system, to select a thread in a ready queue to be dispatched to a processor and determine whether an interrupt mask flag is set in a thread control block associated with the thread. If the interrupt mask flag is set in the thread control block associated with the thread, the dispatcher of FIG. 1 typically selects a processor to process the thread, sets a current processor priority register of the selected processor to least favored, and dispatches the thread from the ready queue to the selected processor.

The term 'least favored' in this specification means least favored for interrupts. Setting a current processor priority register to least favored is often accomplished by storing the value of the highest available interrupt priority in the current processor priority register. There is currently no convention as to whether higher interrupt priorities are represented by high or low values. In some systems, high interrupt priorities are represented by low values, while in other systems, the high interrupt priorities are represented by high values. Any value system defining priorities for interrupts is well within the scope of the present invention.

The exemplary computer (134) of FIG. 1 also includes non-volatile computer memory (166) coupled through a system bus (160) to processors (156) and to other components of the computer. Non-volatile memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art.

The example computer (134) of FIG. 1 includes a communications adapter (167) implementing connections for data communications with other computers, clients, servers, or networks. Communications adapters implement the hardware level of connections for data communications between computers directly with one another and through networks. Examples of communications adapters include modems for wired dial-up connections, Ethernet (IEEE 802.3) adapters for wired LAN connections, and 802.11b adapters for wireless LAN connections.

The example computer (134) of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181), such as keyboards and mice.

Figure 2:
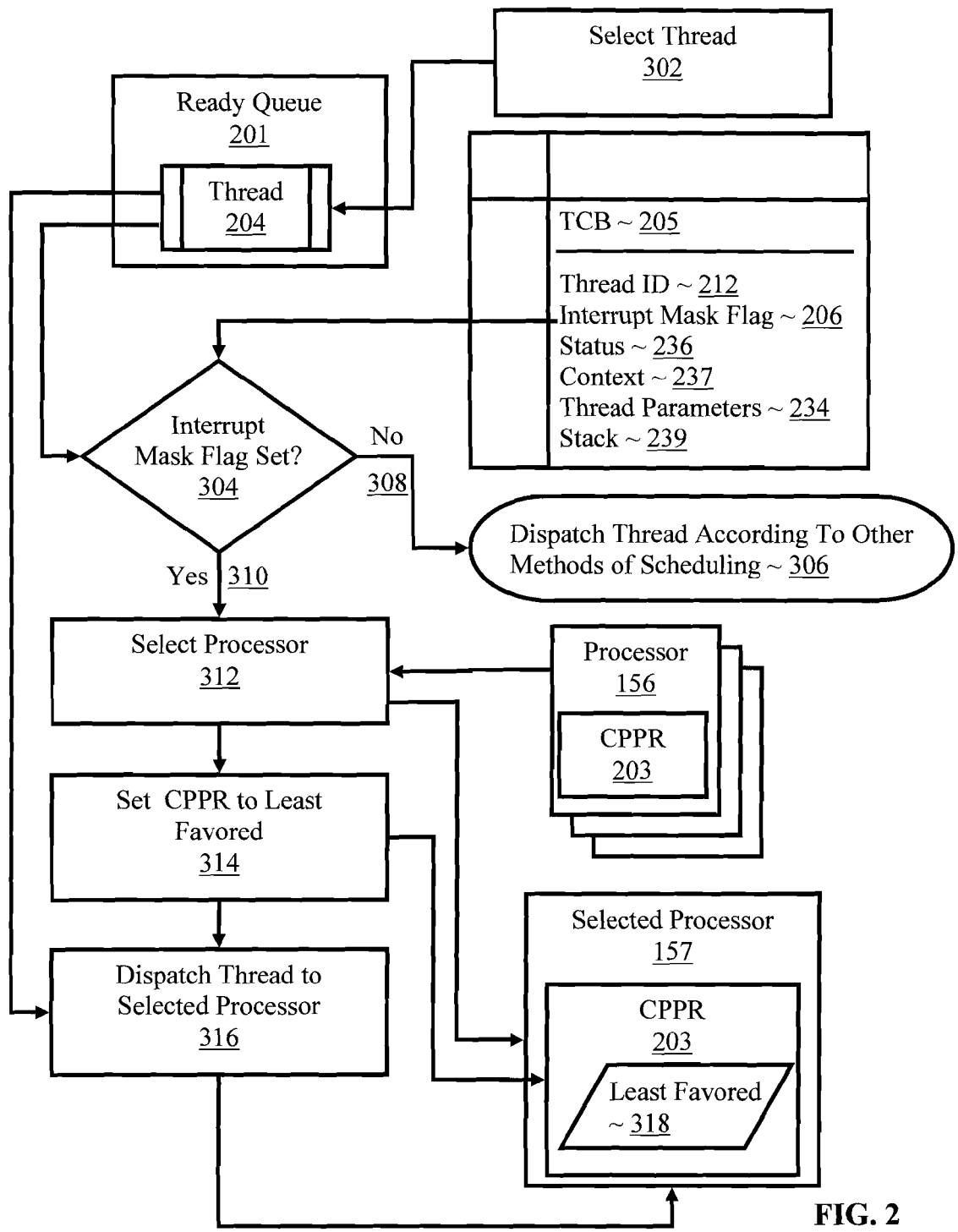
FIG. 2 sets forth a flow chart illustrating an exemplary method of scheduling threads in a multiprocessor computer.

For further explanation, FIG. 2 sets forth a flow chart illustrating a method of scheduling threads in a multiprocessor computer that includes selecting (302) a thread (204) in a ready queue (201) to be dispatched to a processor and determining (304) whether an interrupt mask flag (206) is set in a thread control block (205) associated with the thread (204). The exemplary thread control block of FIG. 2 is a data structure representing the thread (204) typically saved on fast local memory directly available to the dispatcher with no need to access main memory. The exemplary thread control block (205) includes a thread ID (212) uniquely identifying the thread. The thread control block (205) of FIG. 2 also includes an interrupt mask flag (206) which is typically a Boolean indication to the dispatcher to schedule the thread according to embodiments of the present invention. That is, when the interrupt mask flag (206) is set, the exemplary dispatcher of FIG. 2 selects a processor to process the thread, sets a current processor priority register (203) of the selected processor (157) to least favored, and dispatches the thread from the ready queue (201) to the selected processor (157). Setting the interrupt mask flag in the thread control block associated with the thread may be carried out through the use of a command such as SetInterruptMaskFlag( ) that when invoked sets the interrupt mask flag in the thread control block.

The exemplary thread control block of FIG. 2 also includes a status field (236) that holds the status of the thread such as "THREAD_ON_CPU", "THREAD_READY", "THREAD_SUSPENDED", "THREAD_BLOCKED", "THREAD_EXITED" and so on. The exemplary thread control block of FIG. 2 also includes data storage for the thread context (237). The exemplary thread control block of FIG. 2 also includes data storage for thread parameters (234) such as the start function of the thread, stack size, and so on. The exemplary thread control block (205) of FIG. 2 also includes pointer (239) to the stack of the thread.

In the example of FIG. 2, if the interrupt mask flag (206) is set (310) in the thread control block (205) associated with the thread (204), the method includes selecting (312) a processor (157) and setting (314) a current processor priority register (203) of the selected processor (157) to least favored (318), and dispatching (316) the thread (204) from the ready queue (201) to the selected processor (157). Setting (314) a current processor priority register (203) of the selected processor (157) to least favored (318) typically includes storing a value associated with the highest interrupt priority in the current processor priority register. By storing a value associated with the highest interrupt priority in the current processor priority register the thread will run uninterrupted on the selected processor until the thread leaves the processor by issuing a system call, the thread's time slice expiring, or otherwise as will occur to those of skill in the art, because the interrupt will not occur. The method of FIG. 2 advantageously processes the dispatched thread with the priority of the highest priority interrupt, thereby preventing the thread processing being interrupted by any interrupt regardless of the interrupt's priority. By preventing interrupts while the dispatched thread is running, the method of FIG. 2 provides the specific benefit of eliminating the possibility of the second level interrupt handler waiting in the ready queue for an extended period of time because the second level interrupt handler has a lower priority than the currently running thread.

After the thread leaves the processor, either because the thread issued a system call, the thread's time slice expired, or otherwise, the method of FIG. 2, typically includes setting the current processor priority register of the selected processor to a value other than least favored. In many examples of the method of FIG. 2, the current processor priory register is reset to most favored for interrupts, to the interrupt priority of the last interrupt serviced by the processor, or to any other value that will occur to those of skill in the art.

In the example of FIG. 2, if the interrupt mask flag (206) is not set (308) in the thread control block (205) associated with the thread (204), the method continues by dispatching (306) the thread according to other methods of scheduling as will occur to those of skill in the art. Examples of other methods of scheduling include first-come-first-served scheduling, shortest-job-first scheduling, priority scheduling, round-robin scheduling or any other method of scheduling that will occur to those of skill in the art.

The method of FIG. 2 has the potential to result in all the processors of the multi-processor computer or many of the processors in the computer operating with their current processor priority registers set to least favored. In such a situation, no processor or few processors in the computer are available to process interrupts.

Figure 3:
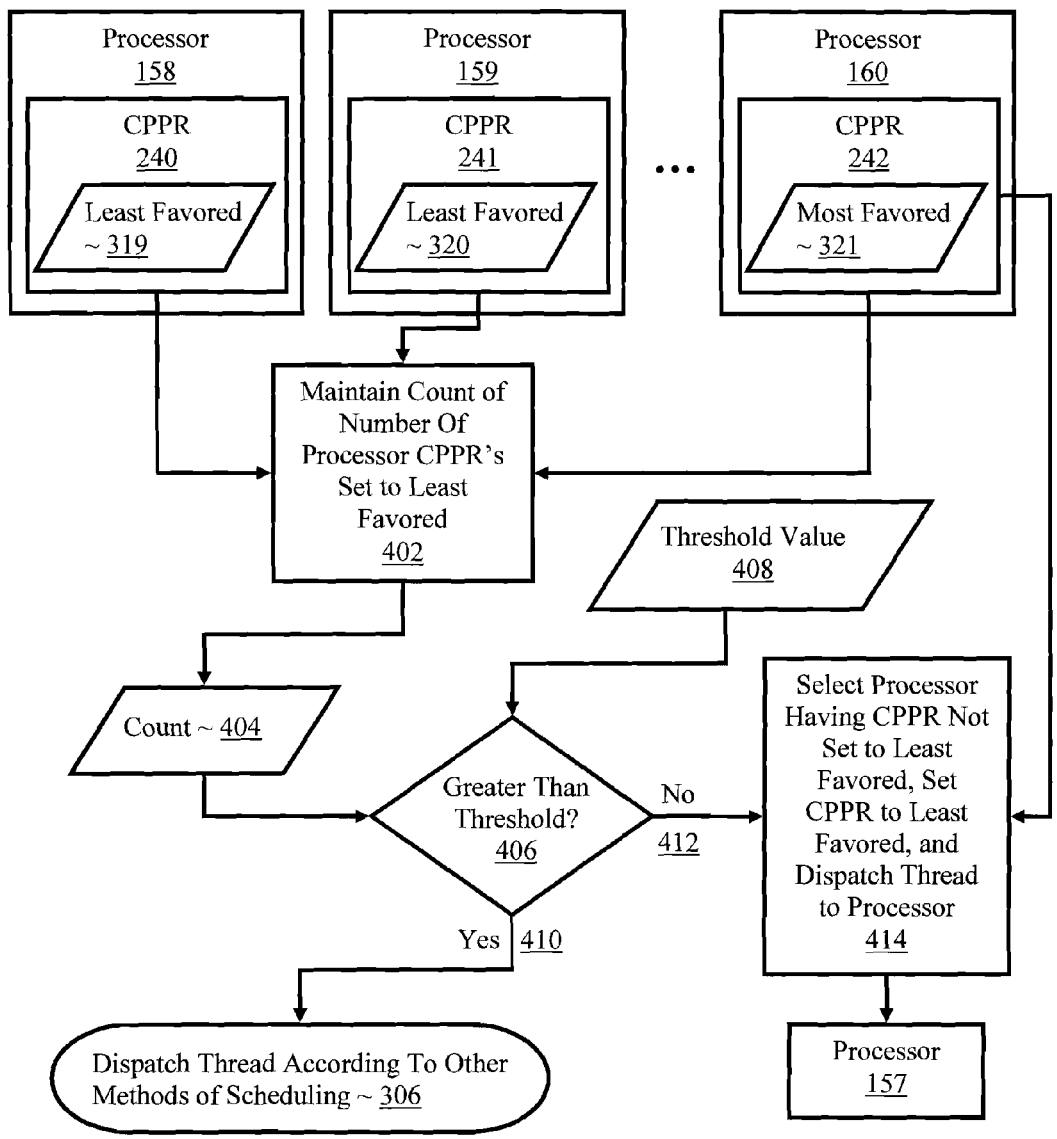
FIG. 3 sets forth a flow chart illustrating an exemplary method for selecting a processor in accordance with embodiments of the present invention.

FIG. 3 sets forth a flow chart illustrating an exemplary method for selecting a processor that includes a balancing mechanism designed to prevent too many of the processors in the computer operating with their current processor priority registers set to least favored. The method of FIG. 3 includes maintaining (402) a count (404) of the number of processors (158, 159, 160) in the multiprocessor computer having a current processor priority register (240, 241, 242) set to least favored. One way of maintaining (402) a count (404) of the number of processors (158, 159, 160) in the multiprocessor computer having a current processor priority register (240, 241, 242) set to least favored includes maintaining a counter in memory available to the dispatcher. Such methods include incrementing the counter each time the current processor priority register of a processor is set to least favored and decrementing the counter each time a thread leaves a processor whose current processor priority register was set to least favored when the thread was dispatched and whose current processor priority register was subsequently reset after the thread left the processor.

The method of FIG. 3 also includes comparing (406) the count (404) of the number of processors (158, 159, 160) having a current processor priority register (240, 241, 242) set to least favored to a threshold value (408). If the count (404) of the number of processors (158, 159, 160) having a current processor priority register (240, 241, 242) set to least favored is less (412) than a threshold value (408), the method of FIG. 3 includes selecting (414) a processor (158, 159, 160) having a current processor priority register (240, 241, 242) not set to least favored, setting a current processor priority register of the selected processor to least favored and dispatching the thread from the ready queue to the selected processor. In the example of FIG. 3, the current processor priority register not set to least favored is instead depicted as set to 'most favored,' (319) or most favored for interrupts. This is not however a limitation of the invention. Selecting (414) a processor (158, 159, 160) having a current processor priority register (240, 241, 242) not set to least favored includes selecting a processor whose current processor priority register is set to any value other than least favored as will occur to those of skill in the art.

In the example of FIG. 3, the threshold value (408) may be held static or dynamically updated. That is, the threshold value may be determined, set for the multiprocessor computer, and never updated or rarely updated. The threshold value may alternatively be dynamically updated to accommodate various periodic load conditions on the processors as will occur to those of skill in the art. Dynamically updating the threshold value may advantageously accommodate known variations in interrupt processing.

If the count (404) of the number of processors (158, 159, 160) having a current processor priority register (240, 241, 242) set to least favored is greater (410) than a threshold value (408), the method of FIG. 3 continues by dispatching (306) the thread according to other methods of scheduling as will occur to those of skill in the art. Examples of other methods of scheduling include first-come-first-served scheduling, shortest-job-first scheduling, priority scheduling, round-robin scheduling or any other method of scheduling that will occur to those of skill in the art.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of scheduling threads in a multiprocessor computer, the method comprising:
   selecting a thread in a ready queue;
   determining whether an interrupt mask flag is set in a thread control block associated with the thread;
   maintaining a count of the number of processors in the multiprocessor computer having a current processor priority register set to least favored;
   if the interrupt mask flag is set in the thread control block associated with the thread, selecting one of the processors of the multiprocessor computers including comparing the count of the number of processors having a current processor priority register set to least favored to a threshold value and if the count of the number of processors having said current processor priority register set to least favored is less than the threshold value, selecting one of the processors of the multiprocessor computers having said current processor priority register not set to least favored;
   dynamically updating the threshold value;
   setting said current processor priority register of the selected processor to least favored including storing a value associated with the highest interrupt priority in the current processor priority register;
   dispatching the thread from the ready queue to the selected processor; and
   setting the current processor priority register of the selected processor to a value other than least favored when the thread leaves the selected processor.

\* \* \* \* \*